US005832603A

United States Patent [19]

Fallandy

[11] Patent Number: 5,832,603

[45] Date of Patent: Nov. 10, 1998

[54] METHOD AND WIRE TERMINATION TOOL FOR RETAINING WIRE IN RECEPTACLE

[75] Inventor: Michael M. Fallandy, Ventura, Calif.

[73] Assignee: Harris Corporation, Melbourne, Fla.

[21] Appl. No.: 784,955

[22] Filed: Jan. 16, 1997

[51] Int. Cl.[6] .............................. H01R 43/04; B23P 23/00

[52] U.S. Cl. .......................... 29/861; 29/566.1; 29/566.4; 29/749

[58] Field of Search ................................ 29/566.4, 566.1, 29/750, 751, 749, 861, 857

[56] References Cited

U.S. PATENT DOCUMENTS

| | | | |
|---|---|---|---|
| 4,241,496 | 12/1980 | Gregson . | |
| 4,318,215 | 3/1982 | Holt | 29/749 X |
| 4,467,516 | 8/1984 | John et al. | 29/566.4 R |
| 4,627,150 | 12/1986 | Burnett | 29/566.4 |
| 4,642,874 | 2/1987 | Litchizer, Jr. | 29/749 X |
| 4,696,090 | 9/1987 | Gregson et al. . | |
| 5,195,230 | 3/1993 | Krietzman . | |
| 5,402,561 | 4/1995 | Cerquone et al. | 29/566.4 |

FOREIGN PATENT DOCUMENTS

| | | |
|---|---|---|
| 0 375 489 | 6/1990 | European Pat. Off. . |

*Primary Examiner*—Carl J. Arbes
*Attorney, Agent, or Firm*—Charles E. Wands

[57] ABSTRACT

A telephone wire termination tool is configured to reliably seat and cut one or more wires in a reduced capacity wire termination receptacle, such as an AT&T/Lucent Technologies, RJ-45/M-series type jack. The tool comprises a pistol handle having a trigger which is operative to bring an actuator into engagement with a wire-insertion and cutting head carrier. The cutting head carrier retains a multiple wire-insertion and cutting head having a plurality of unitary wire-insertion and cutting blades, and is linearly translatable along an axis of the handle towards a nose end of the tool. The carrier cavity is sized such that the cutting head blades protrude from beyond the carrier, so that they may readily engage the reduced capacitry wire termination receptacle retained in a wire termination receptacle holder installed at the nose end of the tool handle. As the operator grips the handle and squeezes the trigger, the carrier will be linearly pushed along the handle axis toward the wire termination receptacle holder, so as to precisely bring the wire termination receptacle and the wire-insertion and cutting head into engagement with one another, and cause the unitary structure-configured blades of the cutting head to seat and cut wires in the wire termination receptacle.

20 Claims, 2 Drawing Sheets

METHOD AND WIRE TERMINATION TOOL FOR RETAINING WIRE IN RECEPTACLE

FIELD OF THE INVENTION

The present invention relates in general to termination tools of the type employed in the telephone industry for seating and cutting the free end of each of one or more wires inserted into resilient telephone wire terminal receptacles, such as AT&T/Lucent Technologies, RJ-45/M-series type jacks. It is particularly directed to a new and improved wire-insertion and cutting tool, which is configured to retain a wire termination receptacle in alignment with a wire-insertion/cutting head that is translated by a trigger mechanism, so as to bring the seating/cutting head into engagement with the wire termination receptacle, and thereby accurately seat and cut one or more wires that have been inserted into the wire termination receptacle.

BACKGROUND OF THE INVENTION

The telephone industry currently offers its craftspersons a variety of wire termination tools for cutting and seating individual telephone wires in telephone wire receptacles. Where the receptacle is a reasonably robust structure, such as a terminal block mounted to a telephone office mainframe unit, an impact tool may be employed. For a non-limiting illustration of documentation describing examples of typical impact tools, attention may be directed to U.S. Pat. Nos. 5,195,230, 4,696,090, 4,567,639, and 4,241,496 and the patents cited therein.

Where the wire termination receptacle is not affixed to a relatively stable structure, however, as in the case of a relatively compact, reduced capacity telephone wire terminal receptacle, such as an AT&T/Lucent Technologies, RJ-45/M-series type terminal jack, as a non-limiting example, installation and cutting of the wires by means of a conventional pliers-type of compression tool (such as an Anixter Part No. 139587) requires careful independent handling of a number of parts, in order to properly align the blades of the insertion and cutting head with the wire seating slots of the jack.

In accordance with the intended functionality of a conventional wire-insertion and cutting head and a standard compression tool, the tines of a respective wire-insertion blade that are retained in a wire-insertion block must be carefully aligned and inserted into a wire-seating slot in the terminal receptacle, so that when the pliers type of compression tool is operated, they may engage a wire that has been placed in the slot and push the wire down and firmly seat the wire against the slot's bottom surface. As the wire becomes seated in the slot as a result of the tool's compression movement of the wire-insertion blade into the slot, the blade's knife, which is retained in a knife support block will have travelled alongside a side edge portion of the terminal receptacle and will cut the wire with a guillotine type of shearing/cutting action at that point. Unfortunately, the experience of craftspersons in the field has revealed that the wire is not necessarily cut in the manner intended, but may be either only partially sheared or not cut at all.

More particularly, if the cutting head is not precisely aligned with the wire installation receptacle, a small amount of play between a knife support block and a wire-insertion blade support block may result. This play, coupled with an offset between the cutting edge of the knife and the side edge of the wire-insertion blade, facilitates deflection of the cutting head's razor blade-like knives around the edge of the terminal receptacle, and allows the entry of foreign matter between the wire-insertion blade support block and the knife support block. As a consequence, rather than cut the wire with the intended guillotine type of shearing/cutting action, the knife either deflects along the exterior of the wire's insulation jacket, or slightly cuts into the jacket—bending the wire around the edge and then down along the side edge of the receptacle.

This problem is exacerbated if the craftsperson fails to properly align the cutting head with the terminal receptacle, as they are engaged by the jaws of the compression tool. If the cutting head is tilted at an angle, for example, rather than being normal to the receptacle, the knife may dig into the receptacle or may extend so far over the edge that the knife does nothing more than bend the wire, without cutting the wire. Any wires that remain uncut as a result of the failure of the impact tool's seating and cutting head to cut such wires, which become seated at the bottom of the terminal receptacle slot, must be severed individually by the craftsperson with a separate wire cutter.

SUMMARY OF THE INVENTION

In accordance with the present invention, these misalignment problems are effectively obviated by a wire termination (insertion and cutting) tool that is configured to reliably seat and cut one or more wires in a reduced capacity wire termination receptacle, such as an AT&T/Lucent Technologies, RJ-45/M-series type jack, referenced above. For this purpose, the termination tool comprises a 'pistol'-configured handle having a hand grip sized to comfortably fit within the palm of a hand of the tool user. A spring-biased trigger mechanism is pivotally attached to the handle. When 'squeezed' by the fingers of a user gripping the hand/piston grip, the trigger brings actuator into engagement with a wire-insertion and cutting head carrier.

The cutting head carrier is configured to capture a multiple wire-insertion and cutting head having a plurality of wire-insertion and cutting blades, preferably having a unitary blade structure of the type described in co-pending U.S. patent application, Ser. No. 08/754,021, filed Jan. 29, 1996, by M. Fallandy, entitled: "Impact Tool Head Having Cutting Knife Integrally Molded With Wire-Insertion Blade," assigned to the assignee of the present application and the disclosure of which is herein incorporated. The cutting head is linearly (slidably) translatable along an axis of the handle towards a forward or nose end of the tool. The carrier cavity is sized such that the cutting head blades protrude from beyond the carrier, so that they may readily engage a wire termination receptacle retained in a wire termination receptacle holder installed at the nose end of the tool handle.

Because the cutting head carrier is translatable in mutual linear alignment with the wire termination receptacle holder, then, as the operator squeezes the trigger, the carrier will be linearly pushed along the handle axis toward the wire termination receptacle holder. This linear mutual translation between the carrier and the holder will precisely bring the wire termination receptacle and the wire-insertion and cutting head into engagement with one another, and cause the unitary structure-configured blades of the cutting head to reliably seat and cut one or more wires in the wire termination receptacle.

DETAILED DESCRIPTION

Figure 1:
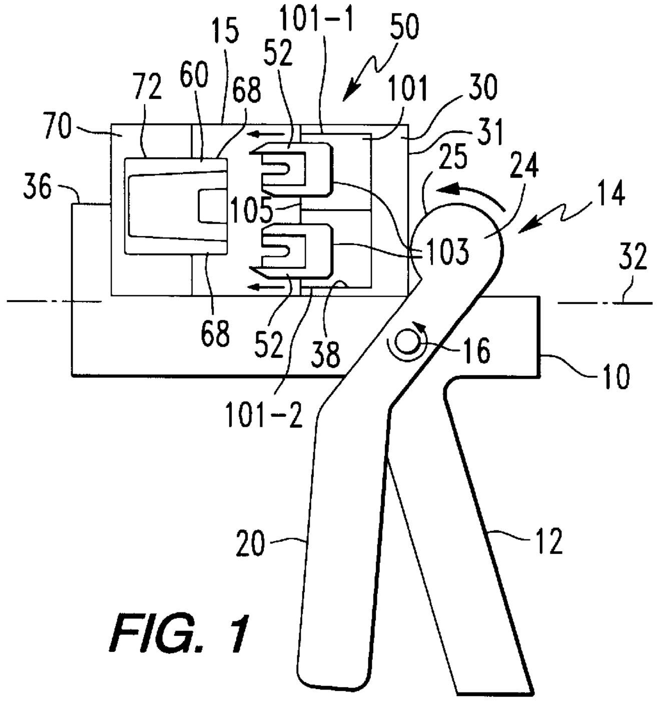
FIG. 1 is a diagrammatic side view of an embodiment of a wire-insertion and cutting tool in accordance with the invention.
Figure 3:
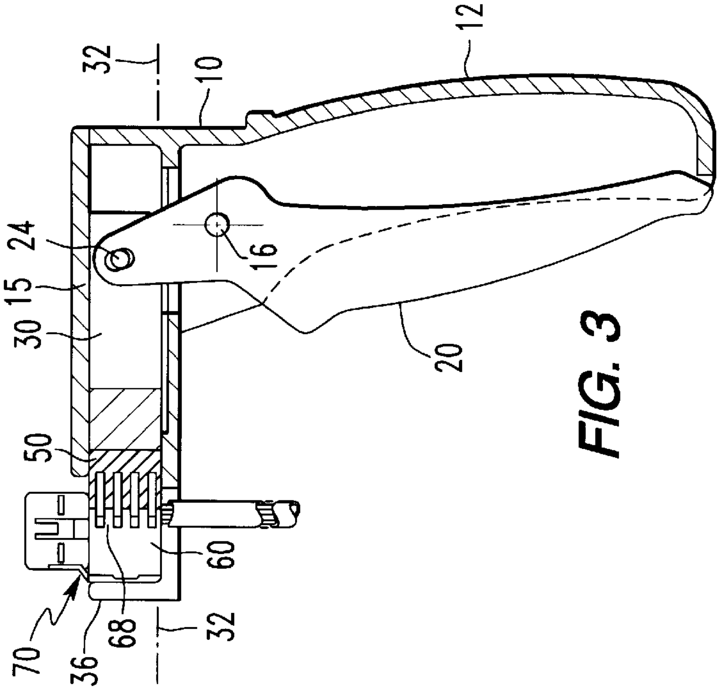
FIGS. 2 and 3 are diagrammatic side views of another embodiment of a wire-insertion and cutting tool in accordance with the invention.
Figure 4:
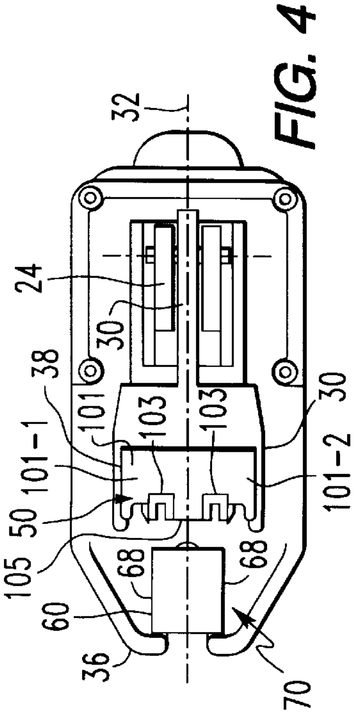
Figure 2:
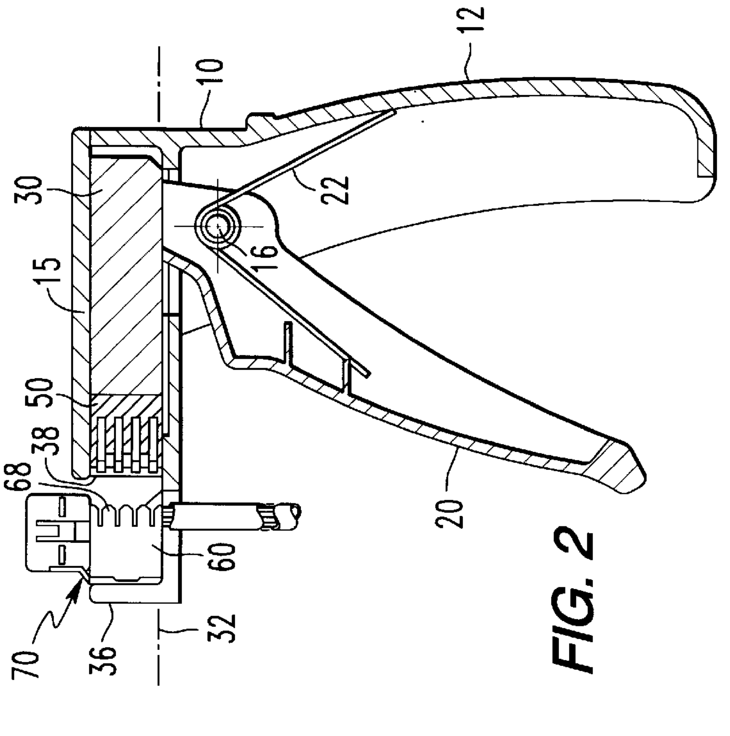

FIGS. 1–5 diagrammatically illustrate two alternative, non-limiting embodiments of a wire-insertion and cutting tool according to the present invention. In the embodiment of FIG. 1, the termination tool is configured to retain a cutting blade carrier and a wire termination receptacle holder, such that each of a pair of blade sets of a cutting head and two rows of slots of a wire termination receptacle are located one on top of the other on a support portion of the tool handle. In the embodiment of FIGS. 2–4, the termination tool is configured to retain a cutting blade carrier and a wire termination receptacle holder, such that each of a pair of blade sets of a cutting head and two rows of slots of a wire termination receptacle are located side by side one another on the support portion of the tool's handle. For the most part, the components of which the tool of the present invention is made may comprise conventional industrial grade, rugged synthetic materials used for the purpose.

Figure 5:
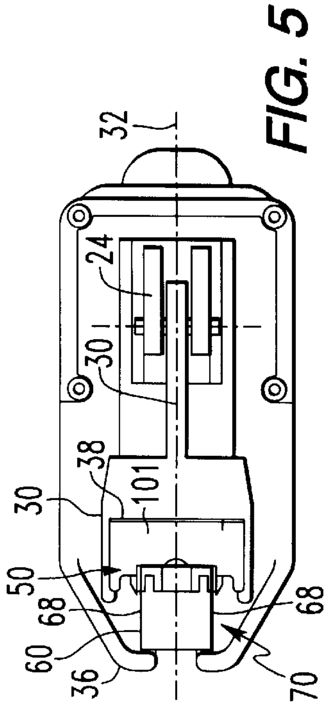
FIGS. 4 and 5 are diagrammatic top views associated with the side views of FIGS. 2 and 3, respectively.

As shown in the side views of FIGS. 1–3, and the top views of FIGS. 4 and 5, each embodiment of the termination tool includes a handle 10 having a hand/pistol grip 12 integral therewith, which is sized to comfortably fit within the palm of a hand of the tool user. A trigger mechanism 14 is pivotally attached to the handle 10 by way of a pivot pin 16. The trigger mechanism 14 has a trigger 20 proper which is biased away from grip 12 by a trigger return spring, shown at 22 in the embodiment of FIGS. 2 and 3, and is configured to be 'squeezed' by the fingers of a user gripping the hand/piston grip 12, thereby causing rotation (counter-clockwise, as viewed in the side views of FIGS. 1–3) of an actuator 24 about pivot pin 16 and into engagement with a linearly translatable wire-insertion and cutting head carrier 30. The cutting head carrier 30 is configured to capture a multiple wire-insertion and cutting head 50, having a plurality of unitary structure-configured, wire-insertion and cutting blades 52, and to be linearly (slidably) translatable along an axis 32 of handle 10 towards a forward or nose end 36 of the handle.

For this purpose, in the embodiment of FIG. 1, the actuator 24 may have a curvilinear cam surface 25 that directly engages a rear surface 31 of the carrier 30, and thereby causes direct linear translation of the carrier 30 along the handle axis 32 toward the nose end of the tool. Alternatively, in the embodiment of FIGS. 2–4, the cutting head carrier 30 may be pivotably attached to the actuator 24 by means of a carrier arm 36, so that (counter-clockwise) rotation of the actuator 24 about pivot pin 16, in turn, effects a 'bell-crank' type of linear translation of the carrier 30 along axis 32 toward the nose end 36 of the handle.

The cutting head carrier 30 may comprise a generally solid shaped element, such as a cylindrical, rectangular, or other shape that is accommodated within and may conform with a complementary hollow interior sleeve portion 15 of the handle, so that the carrier may be readily translated or slide along the axis 32 of the handle. The carrier 30 has a generally rectangularly shaped hollow cavity 38 that is sized and shaped to provide a secure and snug retention of the cutting head 50. The carrier cavity 38 is sized such that the cutting head blades 52 of a captured cutting head 50 protrude from beyond the carrier 30, whereby the blades may readily engage a wire termination receptacle 60, that is retained in a wire termination receptacle holder 70 installed at the forward or nose end 36 of the handle.

Figure 7:
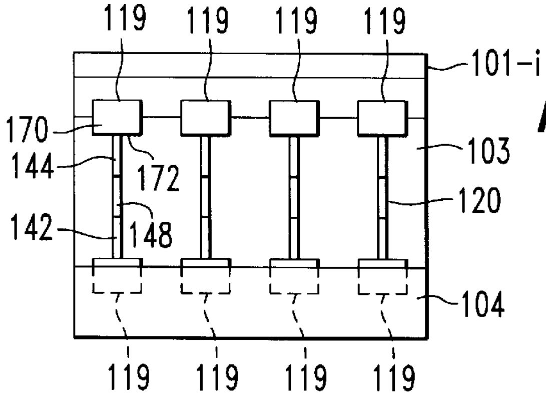
FIG. 7 is a bottom view of a respective sub-block section of a cutting blade support block.
Figure 6:
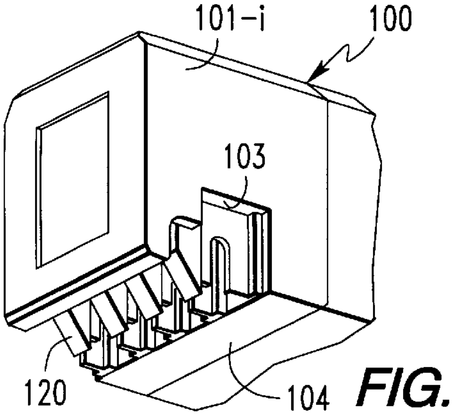
FIG. 6 is a perspective view of a respective sub-block section of a cutting blade support block.

The unitary-blade cutting head itself comprises a single support block 101 having two contiguous, integral sub-block sections 101-1 and 101-2, containing parallel sets or rows of unitary wire-insertion and cutting blades 52, that are configured to conform with the parallel wire seating slots for channels of a standard telephone wire termination receptacle, such as an AT&T/Lucent Technologies, RJ-45/M-series type jack, referenced above. A respective sub-block section **101-*i* of support block 101 includes a longitudinal channel 103 which extends the length of the block, between end faces thereof and terminates at a first generally planar surface 105 of the block. The cutting blade support block may be made as described in the above-referenced co-pending application. A respective sub-block section 101-*i* of the cutting blade support block 100 is shown in the perspective view of FIG. 6 and in the bottom view of FIG. 7 as having a parallel arrangement of hardened steel, unitary cutting blades 52 disposed along each longitudinal channel 103**, with end faces of the blades substantially projecting from bottom face of the sub-block section.

Figure 9:
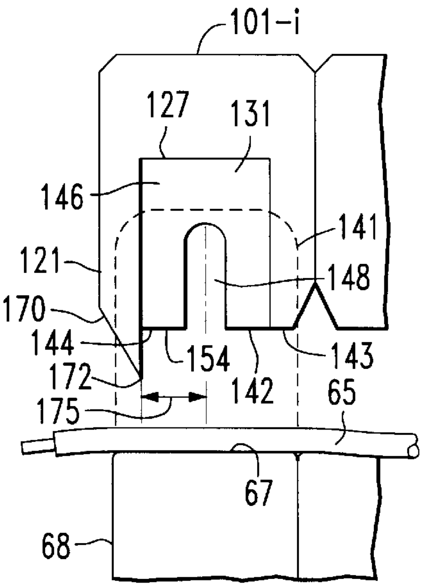
FIG. 9 is a diagrammatic side view of a unitary cutting blade.
Figure 8:
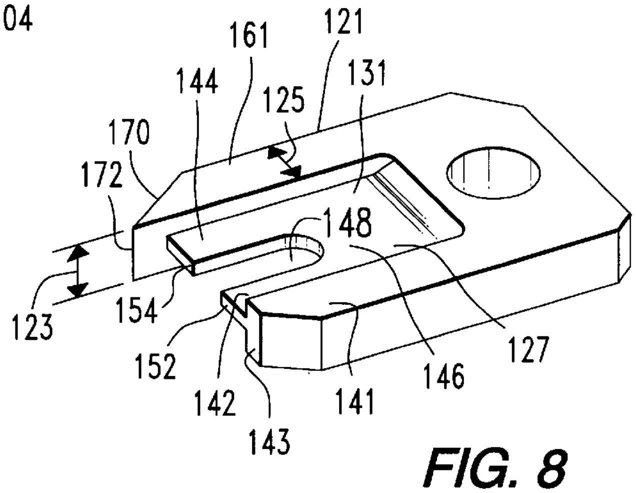
FIG. 8 is a diagrammatic perspective view of a unitary cutting blade.

A respective unitary cutting blade 52 is diagrammatically illustrated in the perspective view of FIG. 8 and in the side view of FIG. 9, as having a generally U-shaped outer cutting knife portion 121, of a thickness 123 and width 125, surrounding a channel region 127, in which a reduced thickness interior wire-insertion blade portion 131 is provided. The generally U-shaped outer cutting knife portion 121 has a first leg portion 141, which adjoins a first blade tine 142 and terminates at a generally planar end face 143. Generally planar end face 143 is coplanar with end face 154 of second blade tine 144 and end face 152 of first tine 142. Blade tines 142 and 144 project from a tine body portion 146 and are spaced apart from one another by a slot 148, that extends a prescribed distance from planar end faces 152 and 154.

The generally U-shaped outer cutting knife portion 121 has a second leg portion 161, which adjoins the second blade tine 144. However, unlike the first leg portion 141, which terminates at the generally planar end face 143, the second leg portion 161 protrudes beyond the planar end faces 152 and 154 of respective tines 142 and 144 in the form of a tapered cutting surface portion 170, which terminates at a knife-edge 172. The distance 174 by which tapered cutting surface portion 170 protrudes beyond the planar end faces 152 and 154 of respective tines 142 and 144 is greater than the thickness of a wire to be seated and cut, so that knife-edge 172 will pass completely through a wire seated in the terminal receptacle 60 by the blade tines 142 and 144.

The hardened steel material of which a respective blade 52 is configured, coupled with the increased thickness 123 of the generally U-shaped outer cutting knife portion 121 of cutting blade 52 relative to that of the tines 142 and 144 within the interior channel region 127, provide the knife-edge cutting surface portion 170 of the cutting blade 52 with the strength and rigidity necessary to cleanly sever a segment of wire, thereby preventing unwanted deflection of the cutting edge. As diagrammatically illustrated in FIG. 7, a respective cutting blade 52 is dimensioned so that, in the course of the cutting head's precise, aligned engagement of the cutting head 50 with the terminal receptacle 60, the blade's knife edge 172 will engage and cleanly cut the wire along the side surface 68 of the terminal receptacle 60, as the wire is urged into the terminal receptacle.

The wire termination receptacle holder 70 is similar to the blade carrier 50, in that it may comprise a generally solid shaped element, such as a cylindrical, rectangular, or other shape that is readily retained in the nose 36 of handle 10 in axial alignment with the blade carrier 50. Like blade carrier 50, the wire termination receptacle holder 70 may have a generally rectangularly shaped hollow cavity 72. The cavity 72 is sized and shaped to retain a multiple wire receptacle 60, such as an AT&T/Lucent Technologies, RJ-45/M-series type jack, referenced above.

With the wire termination receptacle holder 70 installed in the handle 10 in axial alignment with the cutting head carrier 50, operation (squeezing) of the trigger 20 will cause the translatable carrier 30 to be linearly translated along the handle axis 32 towards the nose end 36 of the handle. In particular, the carrier 30 will be linearly pushed along axis 32 toward the wire termination receptacle holder 70, as the operator grips the hand/pistol grip 12 and squeezes the pistol/grip trigger 20. This relative mutual translation between the carrier 30 and the holder 70 will thereby bring all of the blades 52 of the wire-insertion and cutting head 50 into simultaneous mutual engagement with all of the parallel wire seating channels of the wire termination receptacle 60, and thereby cause the blades 52 of the cutting head 50 to simultaneously seat and cut all of the wires that have been inserted into wire seating slots of the wire termination receptacle 60, as diagrammatically illustrated in FIGS. 3 and 5.

As will be appreciated from the foregoing description, the termination tool of the invention effectively solves the problem of requiring a craftsperson to simultaneously handle a plurality of components, in the course of using a conventional pliers-type of compression tool to seat and cut a wire in a reduced capacity wire receptacle, such as an AT&T/Lucent Technologies, RJ-45/M-series type jack. The tool's cutting head carrier is translatable in mutual linear alignment with the wire termination receptacle holder, so that as the operator grips the hand/pistol grip and squeezes the trigger, the carrier will be linearly pushed along the handle axis toward the wire termination receptacle holder. This linear mutual translation between the carrier and the holder will precisely bring the wire termination receptacle and the wire-insertion and cutting head into engagement with one another, and cause the unitary structure-configured blades of the cutting head to reliably seat and cut one or more wires in the wire termination receptacle.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A wire-insertion and cutting tool comprising a handle having a hand grip therefor, said handle including a wire termination receptacle holder configured to retain a wire termination receptacle having a plurality of wire-seating slots into which a plurality of wires are to be seated and cut, and a wire-insertion and cutting head carrier configured to retain a wire-insertion and cutting head having a plurality of unitary wire-insertion and cutting blades in mutual alignment with said plurality of wire seating slots of said wire termination receptacle, said handle supporting said wire termination receptacle holder and said wire-insertion and cutting head carrier for mutual relative linear translation, and a trigger mechanism which is operative to simultaneously bring all of the plurality of unitary wire-insertion and cutting blades of said wire-insertion and cutting head into mutual engagement with all of the plurality of wire-seeking slots of said wire termination receptacle, and thereby simultaneously seat and cut all of said plurality of wires in said wire termination receptacle.

2. A wire-insertion and cutting tool according to claim 1, wherein said wire-insertion and cutting head carrier is slidably translatable in said handle toward said wire termination receptacle as retained by said wire termination receptacle holder, and wherein said trigger mechanism is pivotally attached to said handle and is arranged to linearly translate said wire-insertion and cutting head carrier so as to bring said wire-insertion and cutting head into engagement with said wire termination receptacle and thereby simultaneously seat and cut all wires in said wire termination receptacle.

3. A wire-insertion and cutting tool according to claim 1, wherein said wire-insertion and cutting head comprises parallel rows of plural unitary wire-insertion and cutting blades in a support member, each unitary wire-insertion and cutting blade having both a wire-insertion blade and a cutting knife edge formed in a single continuous element, thereby preventing play between the insertion blade and the knife edge.

4. A wire-insertion and cutting tool according to claim 3, wherein said knife edge is located relative to a slot in said cutting blade so as to cause said cutting knife edge to cut a respective wire at a surface of said wire termination receptacle, as said respective wire is urged into said wire termination receptacle by said blade during operation of said trigger mechanism.

5. A wire-insertion and cutting tool according to claim 4, wherein said wire-insertion blade has first and second tines which are solid with and adjoin said cutting knife edge and have a thickness less than the thickness of said cutting knife edge, and wherein said wire-insertion blade has a slot between said tines, and wherein the distance between said knife edge and said slot between said blade tines is such that said knife edge is prevented from extending over or deflecting around an edge of a wire termination receptacle in the course of engagement between said wire-insertion and cutting head and said wire termination receptacle.

6. A wire-insertion and cutting head according to claim 5, wherein said unitary wire-insertion and cutting blade comprises a generally U-shaped outer cutting blade surrounding a reduced thickness interior wire-insertion blade, said generally U-shaped outer cutting blade having a first leg, which adjoins a first blade tine of said wire-insertion blade and terminates at a generally planar end face, coplanar with an end face of a second blade tine, said first and second blade tines being spaced apart from one another by a slot therebetween, and a second leg adjoining said second blade tine, and protruding beyond said planar end faces of said tines in the form of a tapered cutting surface, that terminates at a knife-edge.

7. A wire-insertion and cutting tool according to claim 6, wherein said tapered cutting surface of said second leg protrudes beyond the tines by a distance greater than the thickness of a wire to be seated and cut, so that knife-edge cuts completely through a wire seated in a wire termination receptacle.

8. A wire-insertion and cutting tool according to claim 1, wherein said wire-insertion and cutting head comprises a generally rectangularly shaped cutting blade support block that includes a pair of parallel longitudinal channels, a plurality of wire-insertion and cutting blades installed along each of said channels and having end faces thereof substantially flush with a planar surface of said cutting blade support block, wherein a respective cutting blade is comprised of an outer knife edge solid with and surrounding a wire-insertion blade, said outer knife edge including a knife edge which protrudes beyond said wire-insertion blade.

9. A wire-insertion and cutting tool according to claim 8, wherein said wire-insertion blade has tines which are solid with, adjoin and have thickness less than the thickness of said outer knife edge, said wire-insertion blade has a slot between said tines, and wherein the distance between said knife edge and said slot between said tines is such that said knife edge is prevented from extending over or deflecting around an edge of said wire termination receptacle as said wire-insertion and cutting head engages said wire termination receptacle.

10. A wire-insertion and cutting tool according to claim 1, wherein said wire termination receptacle comprises an RJ-45 or M-series type wire termination receptacle.

11. A method of seating and cutting a plurality of wires that have been inserted into a plurality of wire-seeking slots of a reduced capacity telephone wire termination receptacle, comprising the steps of:

(a) installing said reduced capacity telephone wire termination receptacle in a wire termination receptacle holder;

(b) installing a wire-insertion and cutting head having a plurality of wire-insertion and cutting blades in a wire-insertion and cutting head carrier;

(c) effecting relative linear translation between said reduced capacity telephone wire terminal receptacle holder and said wire-insertion and cutting head carrier, so as to simultaneously bring all of the plurality of wire-insertion and cutting blades of said wire-insertion and cutting head into mutual engagement with all of the plurality of wire-seating slots of said wire termination receptacle, and thereby simultaneously seat and cut all of the wires in said wire termination receptacle.

12. A method according to claim 11, wherein said wire termination receptacle comprises an RJ-45 or M-series type wire termination receptacle.

13. A method according to claim 11, wherein step (c) comprises slidably translating said wire-insertion and cutting head carrier toward said wire termination receptacle holder.

14. A method according to claim 13, wherein said wire-insertion and cutting head comprises parallel rows of plural unitary wire-insertion and cutting blades in a support member, each unitary wire-insertion and cutting blade having both a wire-insertion blade and a cutting knife edge formed in a single continuous element, thereby preventing play between the insertion blade and the knife edge.

15. A method according to claim 14, wherein said wire-insertion and cutting head comprises a generally rectangularly shaped cutting blade support block that includes a pair of parallel longitudinal channels, a plurality of wire-insertion and cutting blades installed along each of said channels and having end faces thereof substantially flush with a planar surface of said cutting blade support block, wherein a respective cutting blade is comprised of an outer knife edge solid with and surrounding a wire-insertion blade, said outer knife edge including a knife edge which protrudes beyond said wire-insertion blade.

16. A method according to claim 15, wherein said knife edge is located relative to a slot in said cutting blade so as to cause said cutting knife edge to cut a respective wire at a surface of said wire termination receptacle, as said respective wire is urged into said wire termination receptacle by said blade during operation of said trigger mechanism.

17. A method according to claim 16, wherein said wire-insertion blade has first and second tines which are solid with and adjoin said cutting knife edge and have a thickness less than the thickness of said cutting knife edge, and wherein said wire-insertion blade has a slot between said tines, and the distance between said knife edge and said slot between said blade tines is such that said knife edge is prevented from extending over or deflecting around an edge of said termination receptacle in the course of engagement between said wire-insertion and cutting head and said wire termination receptacle.

18. A method according to claim 17, wherein said unitary wire-insertion and cutting blade comprises a generally U-shaped outer cutting blade surrounding a reduced thickness interior wire-insertion blade, said generally U-shaped outer cutting blade having a first leg, which adjoins a first blade tine of said wire-insertion blade and terminates at a generally planar end face, coplanar with an end face of a second blade tine, said first and second blade tines being spaced apart from one another by a slot therebetween, and a second leg adjoining said second blade tine, and protruding beyond said planar end faces of said tines in the form of a tapered cutting surface, that terminates at a knife-edge.

19. A method according to claim 18, wherein said tapered cutting surface of said second leg protrudes beyond the tines by a distance greater than the thickness of a wire to be seated and cut, so that knife-edge cuts completely through a wire seated in a wire termination receptacle.

20. A method according to claim 15, wherein step (c) comprises installing said reduced capacity telephone wire termination receptacle holder and said wire-insertion and cutting head carrier in a linear translation path of a manually hand-grippable handle, and operating a trigger mechanism to effect said relative linear translation between said reduced capacity telephone wire terminal receptacle holder and said wire-insertion and cutting head carrier, and thereby bring said wire termination receptacle and said wire-insertion and cutting head into engagement with one another, simultaneously seating and cutting all of said plurality of wires in said wire termination receptacle.

* * * * *